(12) United States Patent
Anghel

(10) Patent No.: US 11,451,058 B2
(45) Date of Patent: Sep. 20, 2022

(54) GENERATOR SYSTEM FOR MULTIPLE HIGH VOLTAGE DIRECT CURRENT APPLICATIONS

(71) Applicant: Honeywell International Inc., Charlotte, NC (US)

(72) Inventor: Cristian E. Anghel, Tucson, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/167,972

(22) Filed: Feb. 4, 2021

(65) Prior Publication Data

US 2022/0247182 A1  Aug. 4, 2022

(51) Int. Cl.
*H02P 9/00* (2006.01)
*H02J 3/36* (2006.01)
*H02M 7/06* (2006.01)
*H02P 9/02* (2006.01)

(52) U.S. Cl.
CPC ............. *H02J 3/36* (2013.01); *H02M 7/06* (2013.01); *H02P 9/02* (2013.01)

(58) Field of Classification Search
CPC ........................................................ H02J 3/36
See application file for complete search history.

(56) References Cited

U.S. PATENT DOCUMENTS 6,144,567 A * 11/2000 Asplund .................... H02J 3/36
363/37
6,788,029 B1 * 9/2004 Gabrys ...................... H02J 1/16
322/4

8,174,138 B2  5/2012 Castelli Dezza et al.
9,197,138 B2  11/2015 Feng et al.
(Continued)

FOREIGN PATENT DOCUMENTS

GB         2578362 A     5/2020
WO      2012116378 A2    8/2012

OTHER PUBLICATIONS

European Patent Office, "Extended European Search Report from EP Application No. 22151775.8", from Foreign Counterpart for U.S. Appl. No. 17/167,972, dated Jul. 4, 2022, pp. 1-9, Published: EP.

(Continued)

*Primary Examiner* — Jared Fureman
*Assistant Examiner* — Esayas G Yeshaw
(74) *Attorney, Agent, or Firm* — Fogg & Powers LLC

(57) ABSTRACT

Techniques for achieving a variety of selected direct current (DC) voltage outputs are disclosed. In one embodiment, a power generation system includes at least one multi-phase generator configured to generate an alternating current (AC) voltage. A plurality of diode rectifier circuits is coupled to the at least one multi-phase generator, which are configured to receive the AC voltage and convert the AC voltage to a DC voltage output. The power generation system includes configuration circuitry coupled to the plurality of diode rectifier circuits configured to configure the diode rectifier circuits in multiple configurations. For example, the configuration circuitry can configure the diode rectifier circuits in a series configuration to achieve a first DC voltage level, a parallel configuration to achieve a second DC voltage level, or a mixed series-parallel configuration to achieve a third DC voltage level.

20 Claims, 8 Drawing Sheets

(56) References Cited

U.S. PATENT DOCUMENTS

| | | |
|---|---|---|
| 9,362,848 B2 | 6/2016 | Trainer |
| 9,692,311 B2 | 6/2017 | Kim et al. |
| 10,123,450 B2 | 11/2018 | Sarti |
| 10,658,959 B2 | 5/2020 | Lando et al. |
| 2006/0226703 A1* | 10/2006 | Schreiber ................ B60L 58/20 |
| | | 307/10.1 |
| 2011/0254284 A1 | 10/2011 | Catucci et al. |
| 2012/0272076 A1* | 10/2012 | Tsai .................... H04B 5/0081 |
| | | 713/300 |
| 2015/0061606 A1* | 3/2015 | Pan ........................ H02P 9/008 |
| | | 322/7 |
| 2015/0229218 A1* | 8/2015 | Hosoda ............ H02M 3/33507 |
| | | 363/21.01 |
| 2016/0233406 A1 | 8/2016 | Kurikuma et al. |

OTHER PUBLICATIONS

Iankovic et al., Experimental Comparison of Rectifiers for Lundell Automotive Alternators, 13th European Conference on Power Electronics and Applications, 2009: EPE '09; Sep. 8-10, 2009, Barcelona, Spain.

Sakamoto et al., "5.8-GHz Series/Parallel Connected Rectenna Array Using Expandable Differential Rectenna Units", IEEE Transactions on Antennas and Propagation, vol. 61, No. 9, Sep. 2013, pp. 4872 through 4875.

\* cited by examiner

| Generators (Number) | Phases (Number) | Gen. Voltage Line-to-Neutral (Vac) | Power (kW) | Input Speed | Diode Rectifier Circuits | Circuit Configuration | Output Voltage (VDC) |
|---|---|---|---|---|---|---|---|
| 1 | 6 | 270 | 250 | Constant | 2 | Parallel | 600 |
| 1 | 6 | 270 | 125 | Constant | 2 | Parallel | 600 |
| 1 | 6 | 270 | 125 | Constant | 2 | Parallel | 300 |
| 1 | 6 | 270 | 125 | Variable | 2 | Series | 600 |
| 1 | 6 | 270 | 125 | Variable | 2 | Parallel | 300 |
| 1 | 6 | 135 | 250 | Constant | 2 | Parallel | 300 |
| 1 | 6 | 135 | 125 | Constant | 2 | Parallel | 300 |
| 1 | 6 | 135 | 250 | Constant | 2 | Series | 600 |
| 1 | 6 | 135 | 125 | Constant | 2 | Series | 600 |
| 1 | 6 | 135 | 125 | Variable | 2 | Series | 300 |
| 1 | 12 | 135 | 125 | Variable | 4 | Series | 600 |
| 2 | 6 | 270 | Constant | Constant | 4 | Parallel | 600 |
| 2 | 6 | 270 | Constant | Constant | 4 | Mixed | 1200 |
| 2 | 6 | 270 | Constant | Constant | 4 | Series | 2400 |
| 1 | 12 | 270 | Constant | Constant | 4 | Parallel | 600 |
| 1 | 12 | 270 | Constant | Constant | 4 | Mixed | 1200 |
| 1 | 12 | 270 | Constant | Constant | 4 | Series | 2400 |

FIG. 7

GENERATOR SYSTEM FOR MULTIPLE HIGH VOLTAGE DIRECT CURRENT APPLICATIONS

BACKGROUND

As vehicles have evolved over the past few decades, so has the demand for electrical systems that enable functionality for these vehicles. Particularly for aerial and ground vehicles, electrification has resulted in a demand for systems that can produce High Voltage Direct Current (HVDC) at high power levels, for example, at 100 kW or greater. As used herein, the term "high voltage direct current" means a direct current (DC) potential difference of 270 VDC or greater.

However, many electrical systems suffer from a lack of versatility; or, to put it another way, the flexibility to adapt or operate with different power and voltage specifications. For example, many electrical power systems rely on generators that operate at a constant or variable input speed to produce voltage for a specified application. As used herein, the term "constant input speed" of a generator means an input speed approximately within 90% to 110% of the maximum average input speed for that generator. Likewise, the term "variable input speed" of a generator means a generator configured to operate at an input speed approximately between 50% to 100% of the maximum average input speed.

A constant speed generator is significantly different than a variable speed generator in both form and function. Specifically, these two types of generators can differ in size, weight, and in cost. Due to these differences, it is often impractical from both a technical and economical perspective to interchange one for the other in an already implemented electrical system. As a result, the cost burden for applications that utilize both types of generators increases through the engineering effort to design two separate generators and by maintaining separate spare inventory for both. In addition, accommodating for both types of generators can unduly increase the complexity of electrical systems on vehicles that benefit through the use of both types of generators.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a system is provided. The system comprises at least one multi-phase generator, wherein the at least one multi-phase generator is configured to generate an alternating current (AC) voltage output. The system further comprises a plurality of diode rectifier circuits coupled to the at least one multi-phase generator. Each of the plurality of diode rectifier circuits comprises a plurality of diodes. The plurality of diode rectifier circuits is configured to receive the AC voltage output and convert the generated AC voltage output to a direct current (DC) voltage output. The system further comprises configuration circuitry coupled to the plurality of diode rectifier circuits. The configuration circuitry is configured to configure the plurality of diode rectifier circuits in a first, second, and third configuration. In the first configuration each circuit in the plurality of diode rectifier circuits is electrically coupled in parallel to achieve a first selected DC voltage level. In the second configuration at least one first circuit in the plurality of diode rectifier circuits is electrically coupled in series with respect to at least one second circuit in the plurality of circuits to form a first series circuit, and wherein the first series circuit is electrically coupled in parallel with a second series circuit to achieve a second selected DC voltage level. In the third configuration each circuit in the plurality of diode rectifier circuits is electrically coupled in series to achieve a third selected DC voltage level.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings as briefly described below.

FIG. 7 is a table including various combinations of generators and diode rectifier circuits to produce selected DC output voltages, as illustrated in multiple embodiments.

Figure 1:
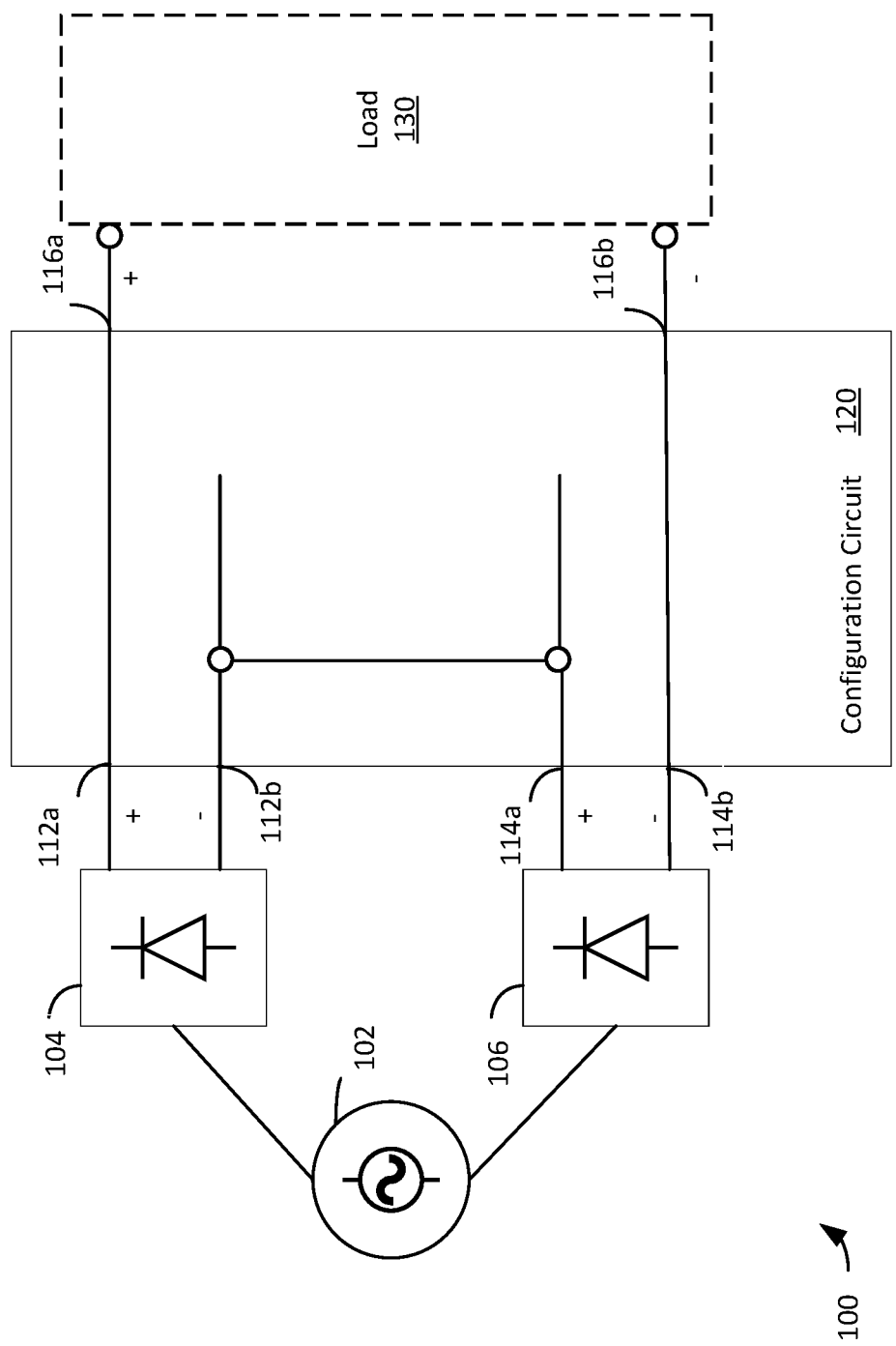
FIG. 1 is a diagram of a power generation system including a generator coupled to a pair of diode rectifier circuits connected in series, as illustrated in an embodiment.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The following disclosure describes techniques for supplying appropriate voltage loads to external systems or devices needed for system or device functionality. In general, the embodiments described herein provide for a more versatile and adaptable electrical power supply system that can be implemented in a wide variety of applications. Specifically, the embodiments include a plurality of diode rectifier circuits coupled to at least one generator. The plurality of diode rectifier circuits are coupled in one of various configurations (e.g., in series and/or parallel) to achieve a selected voltage output. Such configuration can be used to generate high DC voltage outputs (including 2,400 VDC) applicable to many systems that utilize HVDC power levels to function.

Various technical advantages flow from the techniques and systems disclosed herein. For example, embodiments of the present invention use a configuration circuit and a plurality of diode rectifier circuits to enable one or more generators to produce one of a plurality of output voltage levels including HVDC levels (e.g., from 270 VDC to over 3,000 VDC) at high power levels (100 kW to 1 MW or more).

Advantageously, the building blocks in these embodiments enable the same parts (generator, diode rectifiers, etc.) to produce power generation systems that meet the requirements of a variety of electrical systems and circuits. Furthermore, the power generation systems described can be implemented with constant and variable speed generators, producing a selected DC voltage in both types of generators using the same circuitry for either system. This reduce the cost burden in maintaining two otherwise separate systems utilizing two different multi-phase generators. And by passively converting generator power through diode rectifier circuits, embodiments can deliver power without active power control, thereby increasing the efficiency of the power supply system and simplifying the system architecture.

Referring now to the drawings, FIG. 1 represents a diagram of one example of an power generation system 100 for delivering high voltage at high power to a load or system. In various embodiments, power generation system 100 can produce voltage levels between 300-600 VDC at a power of 125-250 kW. Power generation system 100 includes multi-phase generator 102 and diode rectifier circuits 104 and 106 each coupled to one or more phases of multi-phase generator 102.

Power generation system 100 may be implemented in a vehicle (not shown). Use of the term "vehicle" is not intended to be limiting and includes all classes of vehicles falling within the ordinary meaning of the term. This would include but not limited to, aerial traversing vehicles (e.g., commercial, non-commercial, or recreational aircraft), unmanned and/or space traversing vehicles (e.g., satellites), urban air mobility vehicles, water traversing vehicles (e.g., ships, submarines), and land traversing vehicles (e.g., automobiles including cars, trucks, military tanks, motorcycles).

To supply power, multi-phase generator 102 is configured to generate an alternating current (AC) voltage output, which is then provided to diode rectifier circuits 104 and 106. Multi-phase generator 102 is configured to operate at a constant input speed or a variable input speed. A constant speed generator is one that uses a constant speed generator shaft while a variable speed generator uses a variable speed generator shaft. Examples of a constant speed and variable speed generator include an Auxiliary Power Unit (APU) and a Main Propulsion Engine (MPE), respectively. In various embodiments, multi-phase generator 102 is a six-phase multi-phase generator that provides AC voltage to diode rectifier circuits 104 and 106 from different phases. However, multi-phase generator 102 can be other phase generators as well, such as an 18 or 24 phase generator.

The different phases can additionally be grouped such that one diode rectifier circuit (for example, diode rectifier circuit 104) receives AC voltage signals from a first set of distinct phases, while another diode rectifier circuit (e.g., diode rectifier circuit 106) receives AC voltage signals from a second set of distinct phases that have a different phase angle than the AC signals sent to diode rectifier circuit 104. For example, if multi-phase generator 102 is a six-phase generator, then the six-phase generator 102 can be configured to generate an AC voltage output from six distinct phases, three of which are transmitted to diode rectifier circuit 104 and the remaining three transmitted to diode rectifier circuit 106. In one embodiment, the difference of the phase angle between the two sets of phases can be 30 degrees. In cases where the generators have four sets of 3 phases the 30 degrees between each set of phases is maintained. Alternatively, in this case 30 degrees phase difference can be used between two groups of 3 phases.

Power generation system 100 can generate a selected DC voltage output using generators having a range of specifications. In other words, the power, AC voltage output, and input speed of multi-phase generator 102 can differ and yet still generate a desired DC voltage output. For instance, if the selected DC voltage is 600 VDC, multi-phase generator 102 can include a constant speed generator configured to generate a 135 Vac line-to-neutral output at 250 kW of power. However, other generators are possible. In another embodiment, the same 600 VDC output from power generation system 100 can be generated using a variable speed generator configured to generate a 270 Vac line-to-neutral output at 125 kW of power. One of ordinary skill in the art will appreciate that different voltage levels can be envisioned based on the power, voltage, and input speed specifications of generator 102. For example, power generation system 100 can be configured to generate a selected voltage of 300 VDC, 600 VDC, or higher depending on the specifications of multi-phase generator 102.

Diode rectifier circuits 104 and 106 are connected to configuration circuit 120, which receives the DC voltage converted by each diode rectifier circuit. Specifically, configuration circuit 120 receives the positive output of diode rectifier circuit 104 at input 112a and the negative output at input 112b. Similarly, the positive and negative outputs of diode rectifier bridge 106 are received at inputs 114a and 114b, respectively. Configuration circuit 120 configures the electrical coupling of diode rectifier circuits 104 and 106 to implement a selected DC output voltage. Because the negative output of diode rectifier circuit 104 is electrically coupled to the positive output of diode rectifier circuit 106, diode rectifier circuits 104 and 106 are connected in series. Configuration circuit 120 can include wires and/or bus bars that interconnect the outputs of diode rectifier circuits 104 and 106 in a designated configuration, e.g. in series, as shown in FIG. 1.

By coupling the two diode rectifier circuits in series, power generation system 100 can generate a DC voltage output that approximately doubles the voltage output from diode rectifier circuits. The DC output voltage of the system is supplied by configuration circuit 120 through outputs 116*a* and 116*b*, in which configuration circuit 120 drives the output to a load 130. Load 130 can include any kind of device or system that receives power via the DC voltage output supplied by electrical system 100, as provided by configuration circuit 120. Examples of loads include electric propulsion units, which include high power motor controllers and motors, avionics systems, computers, lights, motors, power outlets, actuators, heaters, sensors and sensor systems, and navigation systems.

Figure 2:
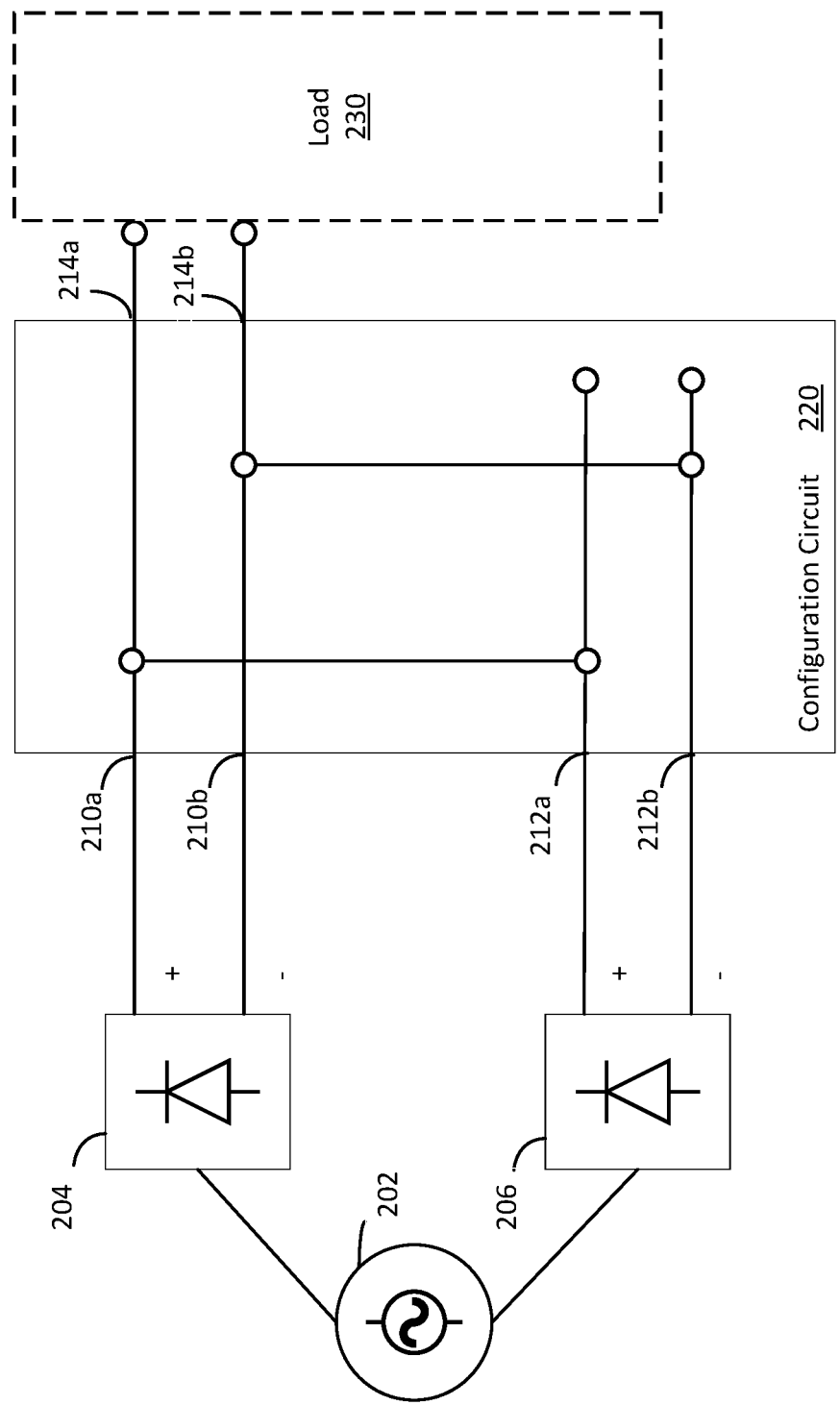
FIG. 2 is a diagram of a power generation system including a generator coupled to a pair of diode rectifier circuits connected in parallel, as illustrated in an embodiment.

In some cases, though, other voltage levels may be desirable, such as implementing power generation system 100 for a different application. In this situation, the diode rectifier circuits 104 and 106 can be configured in a different configuration without configuring or altering the voltage specifications of multi-phase generator 102 to produce the desired DC voltage output. FIG. 2 illustrates one example of such a configuration.

Referring to FIG. 2, power generation system 200 delivers a selected DC power output to a load 230. Similar to power generation system 100, system 200 includes a multi-phase generator 202 coupled to two diode rectifier circuits 204 and 206. Multi-phase generator 202 is configured to operate as either a constant or variable speed generator. Multi-phase generator 202 also generates varying levels of power and AC voltage depending on the specifications of the generator. For example, multi-phase generator 202 can operate at 125 kW or 250 kW and can produce an AC voltage at approximately 135 Vac, 270 Vac line-to-line, or other voltage levels. Diode rectifier circuits 204 and 206 convert a generated AC voltage output from multi-phase generator 202 into a DC voltage output as described above.

Configuration circuit 220 receives the positive and negative outputs of diode rectifier circuit 204 at inputs 210*a* and 210*b* respectively, as well as the positive and negative outputs of diode rectifier circuit 206 at inputs 212*a* and 212*b*. Configuration circuit 220 configures the diode rectifier outputs such that the positive output of diode rectifier circuit 204 is connected to the positive output of diode rectifier circuit 206. Similarly, the negative output of diode rectifier circuit 204 is connected to the negative output of diode rectifier circuit 206. Configuration circuit 220 can then provide the selected DC voltage to a load 230 at outputs 214*a* and 214*b*.

In contrast to power generation system 100, in system 200 diode rectifier circuits are configured in parallel rather than in series. A parallel configuration enables power generation system 200 to output a DC voltage with different voltage levels than those of electrical system 100. Thus, having the diode rectifier circuits configurable in series and/or parallel configurations grants greater flexibility in system design through the ability to generate a wider range of DC voltages. For example, system 200 can be configured to produce DC voltages of 300 VDC, 600 VDC, or other types of voltage levels depending on generator 202. System 200 includes configuration circuit 220 to configure the outputs of the diode rectifier circuits 204 and 206 to achieve a desired voltage level.

Figure 3:
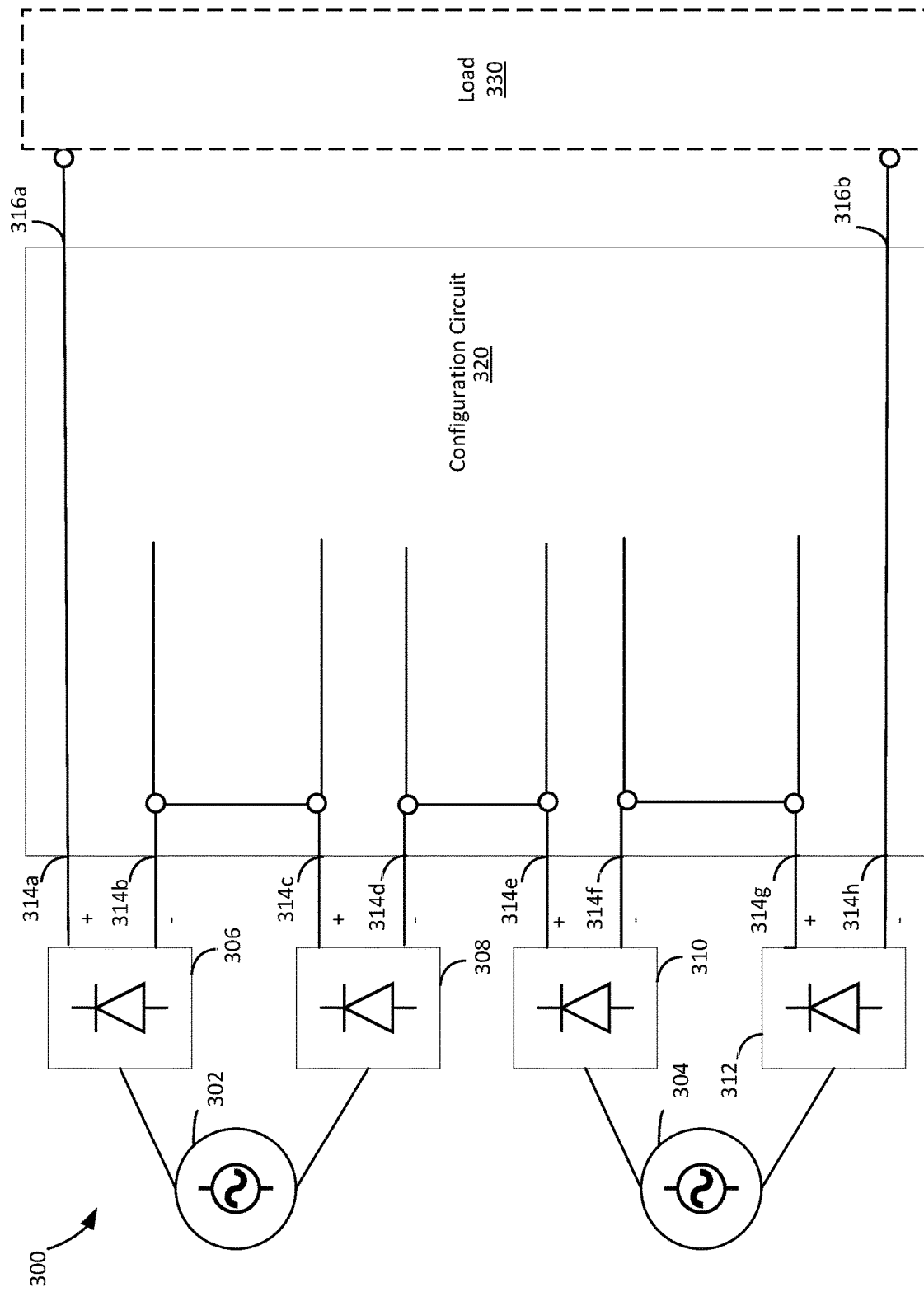
FIG. 3 is a diagram of a power generation system including two generators each coupled to a pair of diode rectifier circuits connected in series, as illustrated in an embodiment.

FIG. 3 illustrates another example of a power generation system 300 for delivering a pre-defined DC power output. In the interest of brevity, the functions and structure of generators 302, 304, and diode rectifier circuits 306, 308, 310, and 312 will not be further described but instead will be understood to one of ordinary skill in the art based on relevant knowledge in the art and the teachings of this disclosure. In various embodiments, multi-phase generators 302 and 304 operate equivalently to those described with respect to FIGS. 1 and 2.

Configuration circuit 320 receives the positive and negative outputs of diode rectifier circuits 306, 308, 310, and 312 at inputs 314*a-h* as shown in FIG. 3. In configuration circuit 320, the negative output of diode rectifier circuit 306 is connected to the positive output of diode rectifier circuit 308, and the negative output of diode rectifier circuit 308 is connected to the positive output of diode rectifier circuit 310. Additionally, the negative output of diode rectifier circuit 310 is connected to the positive output of diode rectifier circuit 312. Configuration circuit 320 then drives the DC voltage output to load 330 through outputs 316*a* and 316*b*.

In the configuration shown in FIG. 3, each multi-phase generator 302 and 304 is respectively coupled to a pair of diode rectifier circuits, which are each connected in series. This configuration enables power generation system 300 to generate higher levels of HVDC voltage outputs than power generation systems 100 or 200 described above. In one embodiment, multi-phase generators 302 and 304 are six-phase generators configured to generate approximately 270 Vac line-to-neutral, in which case power generation system 300 can generate a VDC output of 2,400 VDC. However, higher (e.g., 3,000 VDC, 3,600 VDC) or lower (e.g, 600 VDC, 1,200 VDC) voltages are possible based on the specifications of multi-phase generators 302 and 304.

Figure 4:
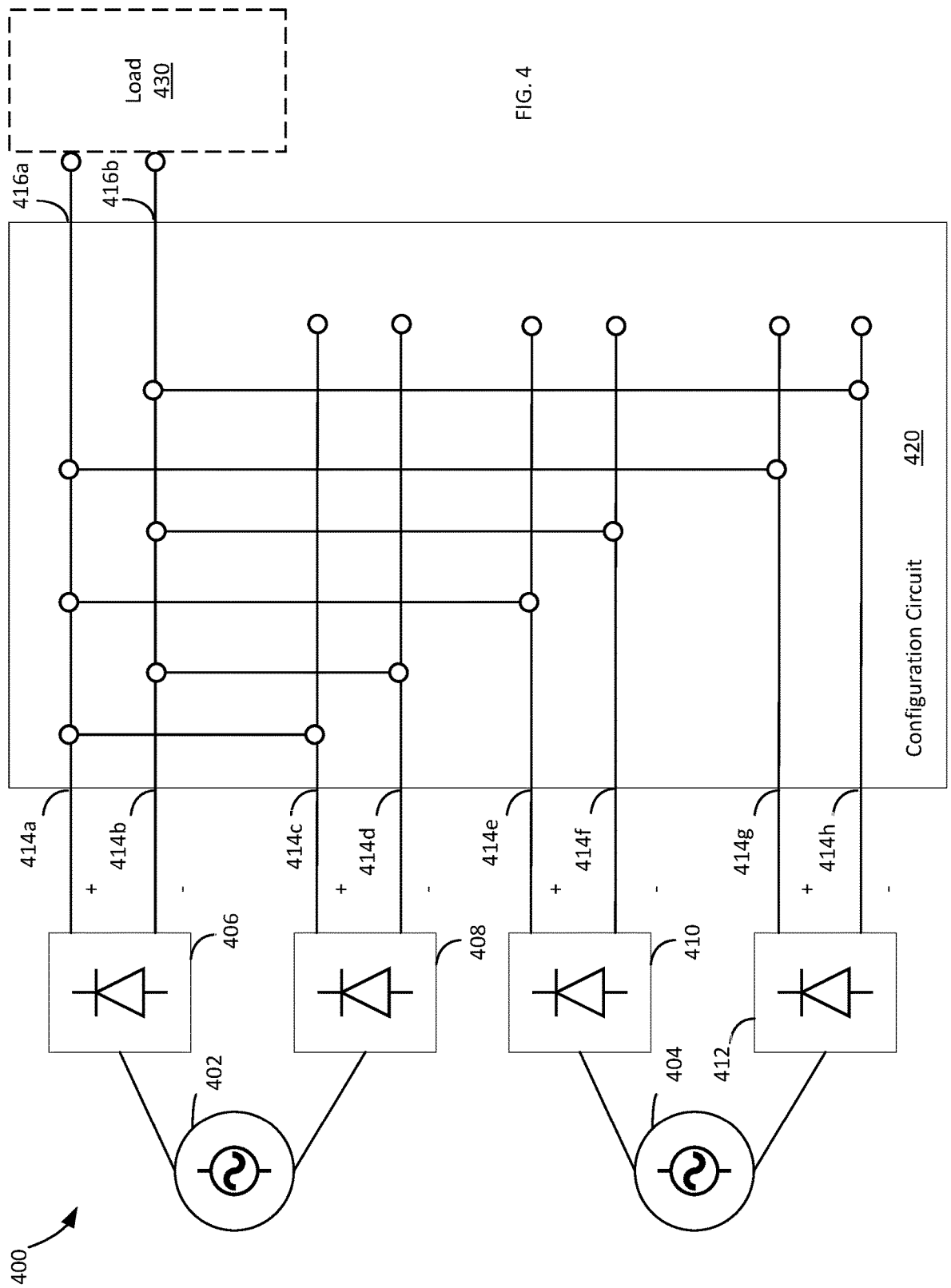
FIG. 4 is a diagram of a power generation system including two generators each coupled to a pair of diode rectifier circuits connected in parallel, as illustrated in an embodiment.

FIG. 4 illustrates another example of a power generation system 400 for delivering a selected DC power output. Like FIG. 3, power generation system 400 includes two multi-phase generators 402 and 404 each coupled to a pair of diode rectifier circuits 406, 408, 410, and 412. Each output of diode rectifier circuit 406, 408, 410, and 412 is received at inputs 414*a-h* of configuration circuit 420 as shown in FIG. 4. Configuration circuit 420 then configures the outputs such that the positive output of diode rectifier circuit 406 is connected to the positive output of diode rectifier circuits 408, 410, and 412. The negative outputs of diode rectifier circuits 408, 410, and 412 are likewise connected to the negative output of diode rectifier circuit 406. Configuration circuit 420 then drives the DC voltage output to load 430 through outputs 416*a-b*.

Unlike FIG. 3, power generation system 400 includes diode rectifier circuits 406, 408, 410, and 412 each configured in parallel to diode rectifier circuit 406 instead of series. This configuration enables power generation system 400 to generate different VDC outputs than that of system 300. In one embodiment, multi-phase generators 402 and 404 are six-phase generators configured to generate approximately 270 Vac line-to-neutral, in which case power generation system 400 can generate a VDC output of 600 VDC at constant power. However, higher or lower voltages are possible based on the specification of multi-phase generators 402 and 404.

Figure 5:
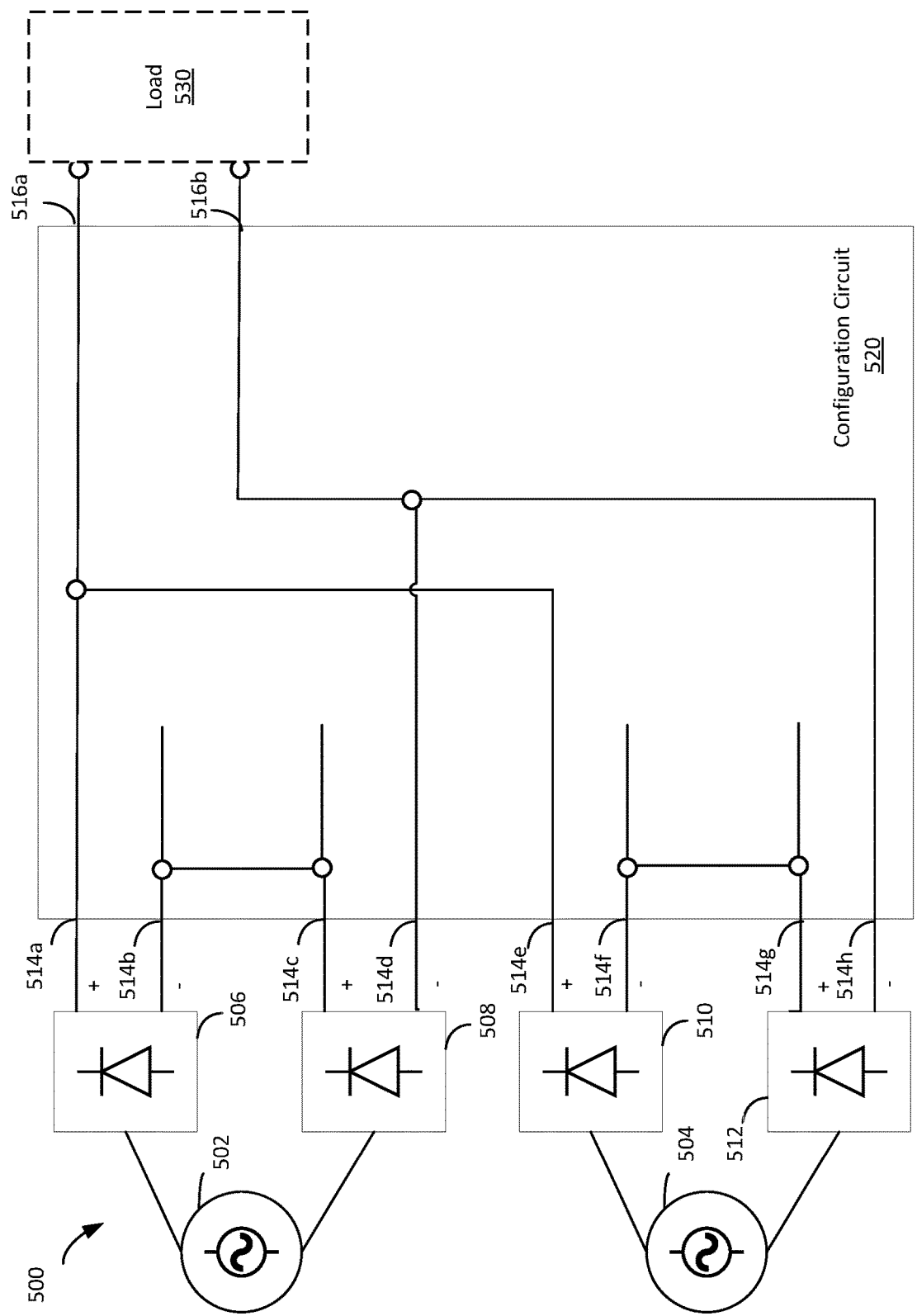
FIG. 5 is a diagram of a power generation system including two generators each coupled to a pair of diode rectifier circuits connected in a mixed series-parallel configuration, as illustrated in an embodiment.

FIG. 5 illustrates another example of a power generation system 500 for delivering a selected DC power output. Like FIGS. 3-4, power generation system 500 includes two multi-phase generators 502 and 504 each coupled to a pair of diode rectifier circuits 506, 508, 510, and 512. The outputs of diode rectifier circuits 506, 508, 510, and 512 are receives at respective inputs 514*a-h* of configuration circuit 520. Configuration circuit 520 then configures the outputs as shown in FIG. 5.

Specifically, the positive output of diode rectifier circuit 506 is connected to the positive output of diode rectifier circuit 510, and the negative output of diode rectifier circuit 508 is connected to the negative output of diode rectifier circuit 512. Additionally, the negative output of diode rectifier circuit 506 is connected to the positive output of diode rectifier circuit 508, and the negative output of diode rectifier circuit 510 is connected to the positive output of diode rectifier circuit 512.

Unlike FIG. 3 or 4, power generation system 500 includes diode rectifier circuits 506, 508, 510, 512 configured in a mix of parallel and series configurations instead of pure parallel or series. As shown in FIG. 5, diode rectifier circuits 506 and 508 are configured in series to form a first series circuit. Similarly, diode rectifier circuits 510 and 512 are also configured in series to form a second series circuit. The two series circuits are then electrically coupled in parallel. Configuration circuit 520 then provides the DC voltage output from the mixed series/parallel combination to load 530 through outputs 516a-b.

The mixed configuration of power generation system 500 enables it to generate different VDC outputs than that of systems 300 and 400. In one embodiment, multi-phase generators 502 and 504 are six-phase generators configured to generate approximately 270 Vac line-to-neutral, in which case power generation system 500 can generate a VDC output of 1,200 VDC. However, higher or lower voltages are possible based on the specification of generators 502 and 504.

Figure 6:
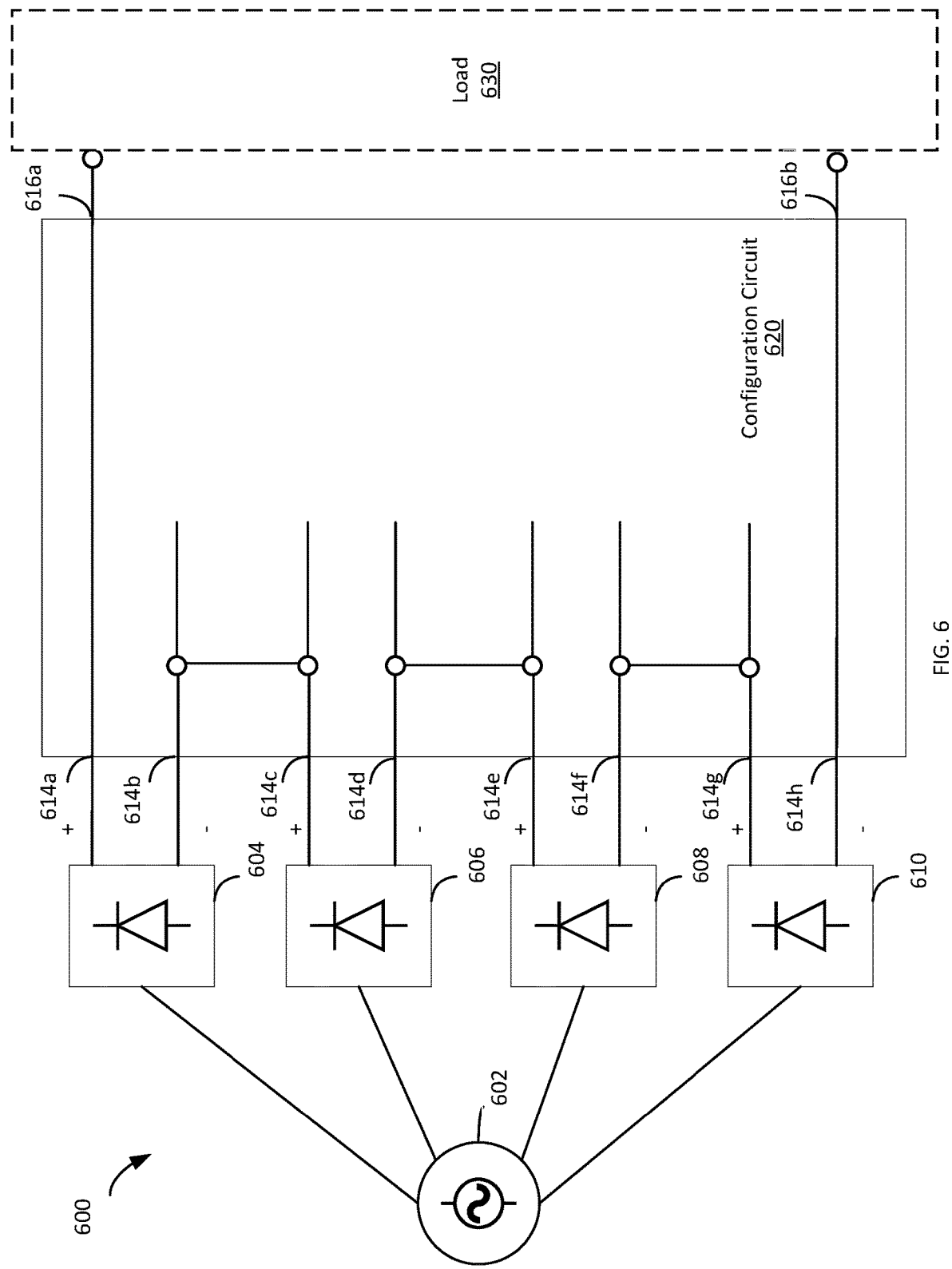
FIG. 6 is a diagram of a power generation system including a generator coupled to a plurality of diode rectifier circuits connected in series, as illustrated in an embodiment.

FIG. 6 illustrates another example of a power generation system 600 for delivering a selected DC power output. Unlike previous systems described, power generation system 600 comprises only one multi-phase generator 602. In an embodiment, multi-phase generator 602 includes a twelve-phase generator configured to generate AC voltage at four sets of phases, wherein each diode rectifier circuit 604, 606, 608, and 610 receives a respective set of phases.

Power generation system 600 functions similarly to power generation system 300, albeit only one twelve-phase generator is used in electrical system 600. Configuration circuit 620 receives the outputs of diode rectifier circuits 604, 606, 608, and 610 through inputs 614a-h. Configuration circuit 620 configures the outputs such that the negative output of diode rectifier circuit 604 is connected to the positive output of diode rectifier circuit 606; the negative output of diode rectifier circuit 606 is connected to the positive output of diode rectifier 608; and the negative output of diode rectifier circuit 608 is connected to the positive output of diode rectifier circuit 610. Configuration circuit 620 then drives the DC voltage output to load 630 through outputs 616a-b.

In the configuration shown in power generation system 600, each diode rectifier circuit 604, 606, 608, and 610 are coupled in series. This configuration enables power generation system 600 to generate varying levels of VDC voltage outputs. For example, in one embodiment, multi-phase generator 602 is configured to generate an output of approximately 270 Vac, in which case power generation system 600 can generate a VDC output of 600 VDC. However, one having ordinary skill can modify power generation system 600 to generate other levels of VDC voltage by configuring the diode rectifier circuits in a different configuration (e.g., in exclusive parallel or mixed series-parallel configurations), based on the parameters (e.g., power, input speed, Vac output) of multi-phase generator 602. System 600 may further include configuration circuit 620 to configure the outputs of the diode rectifier circuits 606, 608, 610, or 612 to achieve a selected voltage level.

Referring to FIG. 7, table 700 illustrates the various instantiations of the embodiments of power generation systems 100-600 as described above. Columns 1-5 depict the number and types of generators that can be used. Column 1 lists the number of multi-phase generators used in the electrical system. Column 2 lists the phases of the multi-phase generator(s). Column 3 lists the AC voltage that the multi-phase generator(s) are configured to generate. Column 4 lists the power of the multi-phase generator(s). And column 5 describes the speed range of the multi-phase generator(s) e.g., whether the generators are variable or constant speed range. Column 6 lists the number of diode rectifier circuits that may be used in each embodiment. Column 7 lists the circuit configuration of the diode rectifier circuits e.g., whether the circuits are configured in series, parallel, or a mixed series/parallel configuration. Finally, column 7 lists the possible selected DC output voltage from each electrical system. However, the embodiments in table 700 are only some of the possible embodiments that can be implemented and that other DC voltage levels can be achieved by adjusting the number of generators and the number (and configuration) of the diode rectifier circuits based on the teachings with respect to FIGS. 1-6.

Figure 8:
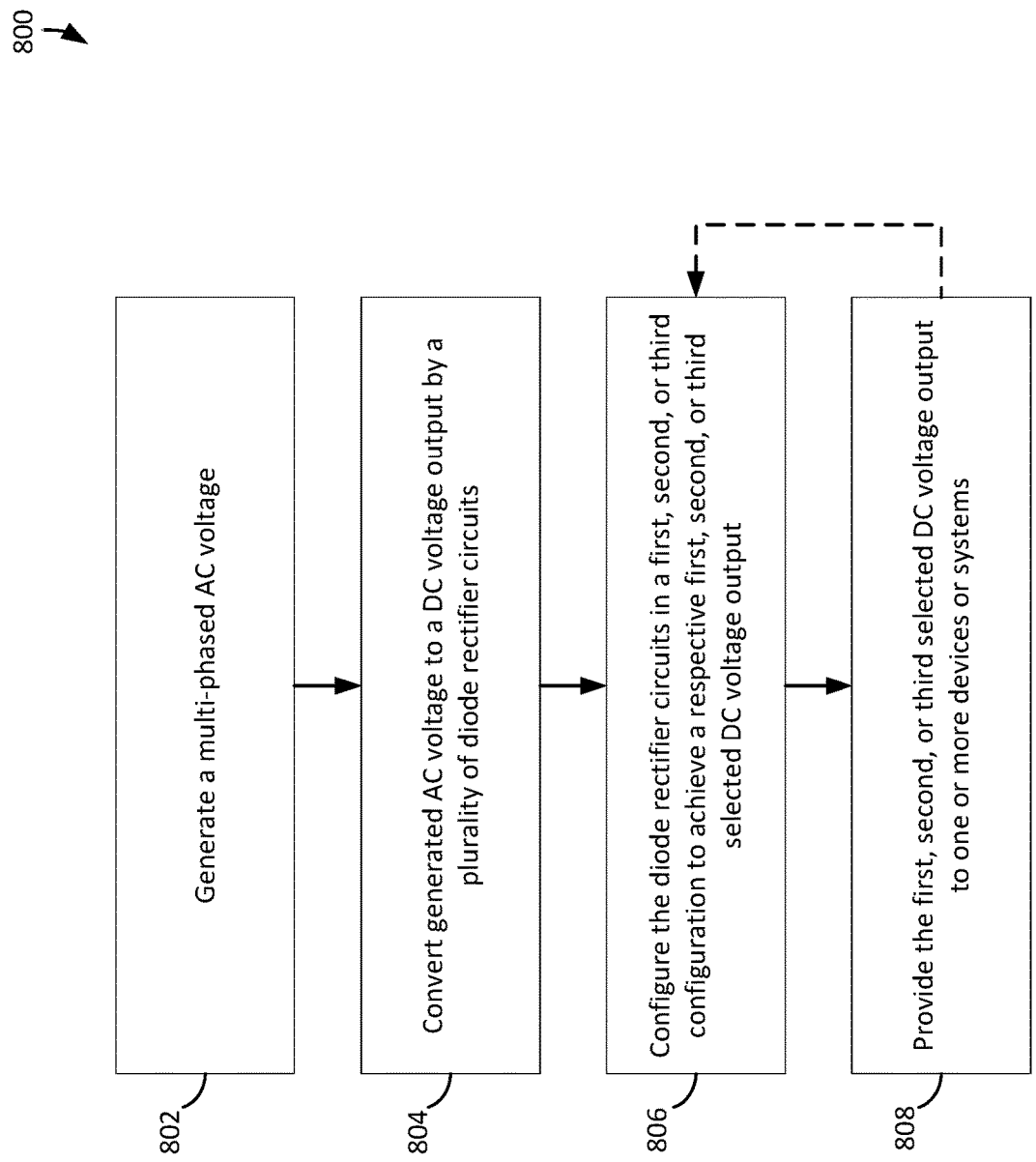
FIG. 8 is a flow chart of a method for producing a selected DC voltage level, as illustrated in one or more embodiments.

FIG. 8 illustrates a flow chart of a method for delivering a selected DC voltage output to a receiving device or system. Method 800 may be implemented via the techniques described with respect to FIGS. 1-7, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 800 begins at block 802 by generating a multi-phased AC voltage, e.g., by a multi-phased generator. At block 804, method 800 proceeds by converting the generated AC voltage to a DC voltage output. In one implementation of method 800, a multi-phase generator generates an AC voltage received by a plurality of diode rectifier circuits coupled to the multi-phase generator. The plurality of diode rectifier circuits are configured to convert the received AC voltage to a DC voltage.

Method 800 then proceeds to block 806 by configuring the diode rectifier circuits in one of a first, second, or third configuration to achieve a selected DC voltage output. In the first configuration, each diode rectifier circuit in the plurality of diode rectifier circuits is electrically coupled in parallel. In contrast, in the second configuration at least one first diode rectifier circuit in the plurality of diode rectifier circuits is electrically coupled in series with respect to at least one second diode rectifier circuit in the plurality of diode rectifier circuits to form a first series circuit, and wherein the first series circuit is electrically coupled in parallel with a second series circuit. And in the third configuration, each diode rectifier circuit in the plurality of diode rectifier circuits is electrically coupled in series. In some embodiments, method 800 can be implemented utilizing configuration circuitry coupled to the plurality of diode rectifier circuits. The configuration circuitry can be configured to configure the plurality of diode rectifier circuits to one of the first, second, and third configurations in order to achieve a selected DC voltage output.

Method 800 then proceeds to block 808 by providing the selected DC voltage output to one or more devices. The level of DC voltage will correspond to the configuration of the plurality of diode rectifier circuits. Method 800 can optionally revert to blocks 806 and 808 to provide a different DC voltage output by configuring the plurality of diode rectifier circuits in a different configuration.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs. The configuration circuits described herein can be realized hard-wired using wires or bus-bars in lieu of a processor, or by using contactors that can be configured by a controller.

EXAMPLE EMBODIMENTS

Example 1 includes a system, comprising: at least one multi-phase generator, wherein the at least one multi-phase generator is configured to generate an alternating current (AC) voltage output; a plurality of diode rectifier circuits coupled to the at least one multi-phase generator, wherein each of the plurality of diode rectifier circuits comprises a plurality of diodes, wherein the plurality of diode rectifier circuits is configured to receive the AC voltage output and convert the generated AC voltage output to a direct current (DC) voltage output; and configuration circuitry coupled to the plurality of diode rectifier circuits, wherein the configuration circuitry is configured to configure the plurality of diode rectifier circuits in a first, second, and third configuration, wherein: in the first configuration each circuit in the plurality of diode rectifier circuits is electrically coupled in parallel to achieve a first selected DC voltage level, in the second configuration at least one first circuit in the plurality of diode rectifier circuits is electrically coupled in series with respect to at least one second circuit in the plurality of circuits to form a first series circuit, and wherein the first series circuit is electrically coupled in parallel with a second series circuit to achieve a second selected DC voltage level, or in the third configuration each circuit in the plurality of diode rectifier circuits is electrically coupled in series to achieve a third selected DC voltage level.

Example 2 includes the system of Example 1, wherein the configuration circuitry is configured to configure the plurality of diode rectifier circuits to a different configuration in response to a change in selected DC voltage level.

Example 3 includes the system of any of Examples 1-2, wherein the configuration circuitry is configured to provide a DC voltage output corresponding to one of the first, second, or third selected DC voltage level to one or more load devices.

Example 4 includes the system of any of Examples 1-3, wherein the multi-phase generator operates at a constant input speed or a variable input speed, wherein each set of phases is coupled to at least two diode rectifier circuits of the plurality of diode rectifier circuits.

Example 5 includes the system of any of Examples 1-4, wherein the multi-phase generator is configured to generate the AC voltage output with a plurality of distinct phase differences, wherein the plurality of diode rectifier circuits receive the AC voltage output at one or more phase differences.

Example 6 includes the system of any of Examples 1-5, wherein the plurality of diode rectifier circuits is further configured to passively convert the generated AC voltage output to at least one of the first, second, and third selected DC voltage levels.

Example 7 includes the system of any of Examples 1-6, wherein the at least one multi-phase generator comprises at least six-phases.

Example 8 includes the system of any of Examples 1-7, wherein the at least one multi-phase generator comprises a plurality of phases, wherein each of the plurality of phases is coupled to a respective pair of diode rectifier circuits of the plurality of diode rectifier circuits.

Example 9 includes the system of any of Examples 1-8, wherein the at least one multi-phase generator is a twelve-phase generator, wherein the twelve-phase generator is coupled to each of the plurality of diode rectifier circuits, wherein each of the plurality of diode rectifier circuits are configured in series with respect to another diode rectifier circuit of the plurality of diode rectifier circuits.

Example 10 includes the system of any of Examples 1-9, wherein an input speed varies between 50% to 100% inclusive of a total speed of the at least one multi-phase generator.

Example 11 includes a method comprising: generating an alternating current (AC) voltage output; converting, by a plurality of diode rectifier circuits, the generated AC voltage output to a direct current (DC) voltage output, configuring, by configuration circuitry coupled to the plurality of diode rectifier circuits, the diode rectifier circuits in one of a first, second, or third configuration, wherein: in the first configuration, each diode rectifier circuit in the plurality of diode rectifier circuits is electrically coupled in parallel to achieve a first selected DC voltage output, in the second configuration, at least one first diode rectifier circuit in the plurality of diode rectifier circuits is electrically coupled in series with respect to at least one second diode rectifier circuit in the plurality of diode rectifier circuits to form a first series circuit, and wherein the first series circuit is electrically coupled in parallel with a second series circuit to achieve a second selected DC voltage output, or in the third configuration, each diode rectifier circuit in the plurality of diode rectifier circuits is electrically coupled in series to achieve a third selected DC voltage output; and providing the first, second, or third selected DC voltage output to one or more load devices, wherein the configuration circuitry is configured to configure the plurality of diode rectifier circuits in the first, second, and third configurations.

Example 12 includes the method of Example 11, wherein the configuration circuitry is configured to configure the plurality of diode rectifier circuits to a different configuration in response to a change in selected DC voltage level.

Example 13 includes the method of any of Examples 11-12, wherein generating an AC voltage output further comprises generating at least a 135 Vac line-to-neutral output.

Example 14 includes the method of any of Examples 11-13, wherein generating an AC voltage output further comprises generating a multi-phase AC voltage output via at least one multi-phase generator, wherein the at least one multi-phased generator comprises two or more sets of three phases.

Example 15 includes the method of Example 14, further comprising operating the at least one multi-phase generator at a constant or variable input speed.

Example 16 includes the method of any of Examples 14-15, further comprising operating the at least one multi-phase generator at an input speed between 50% to 100% inclusive of a total input speed of the at least one multi-phased generator.

Example 17 includes the method of any of Examples 11-16, wherein converting the generated AC voltage output further comprises passively converting the generated AC voltage output using the plurality of diode rectifier circuits.

Example 18 includes the method of any of Examples 11-17, further comprising generating a DC voltage output at one of: 300 VDC, 600 VDC, 1,200 VDC, and 2,400 VDC.

Example 19 includes the method of any of Examples 11-18, wherein converting the generated AC voltage output to a DC voltage output further comprises selecting a DC voltage based on the voltage, power, or current specifications of the one or more load devices.

Example 20 includes the method of any of Examples 11-19, wherein converting the generated AC voltage output by the plurality of diode rectifier circuits further comprises converting by at least four diode rectifier circuits.

The terms "about" or "approximately" mean that the value or parameter specified may be somewhat altered, as long as the alteration does not result in nonconformance of the process or structure to the illustrated embodiment from the perspective of one having ordinary skill in the art. For instance, unless otherwise indicated, a numerical quantity modified by the term "approximately" can be altered to within ±20% of the specified value. Finally, the term "exemplary" merely indicates the accompanying description is used as an example, rather than implying an ideal, essential, or preferable feature of the invention.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:
   at least one multi-phase generator, wherein the at least one multi-phase generator is configured to generate an alternating current (AC) voltage output;
   a plurality of diode rectifier circuits coupled to the at least one multi-phase generator, wherein each of the plurality of diode rectifier circuits comprises a plurality of diodes, wherein the plurality of diode rectifier circuits is configured to receive the AC voltage output and convert the generated AC voltage output to a direct current (DC) voltage output; and
   configuration circuitry coupled to the plurality of diode rectifier circuits, wherein the configuration circuitry is configured to configure the plurality of diode rectifier circuits in one of a first, second, or third configuration, wherein:
   a) in the first configuration each circuit in the plurality of diode rectifier circuits is electrically coupled in parallel to achieve a first selected DC voltage level,
   b) in the second configuration at least one first circuit in the plurality of diode rectifier circuits is electrically coupled in series with respect to at least one second circuit in the plurality of circuits to form a first series circuit, and wherein the first series circuit is electrically coupled in parallel with a second series circuit to achieve a second selected DC voltage level, or
   c) in the third configuration each circuit in the plurality of diode rectifier circuits is electrically coupled in series to achieve a third selected DC voltage level,
   wherein the first selected DC voltage level is distinct from the second selected DC voltage level and the third selected DC voltage level.

2. The system of claim 1, wherein the configuration circuitry is configured to configure the plurality of diode rectifier circuits to a different configuration in response to a change in selected DC voltage level.

3. The system of claim 1, wherein the configuration circuitry is configured to provide a DC voltage output corresponding to one of the first, second, or third selected DC voltage level to one or more load devices.

4. The system of claim 1, wherein the multi-phase generator operates at a constant input speed or a variable input speed, wherein each set of phases is coupled to at least two diode rectifier circuits of the plurality of diode rectifier circuits.

5. The system of claim 1, wherein the multi-phase generator is configured to generate the AC voltage output with a plurality of distinct phase differences, wherein the plurality of diode rectifier circuits receive the AC voltage output at one or more phase differences.

6. The system of claim 1, wherein the plurality of diode rectifier circuits is further configured to passively convert the generated AC voltage output to at least one of the first, second, and third selected DC voltage levels.

7. The system of claim 1, wherein the at least one multi-phase generator comprises at least six-phases.

8. The system of claim 1, wherein the at least one multi-phase generator comprises a plurality of phases, wherein each of the plurality of phases is coupled to a respective pair of diode rectifier circuits of the plurality of diode rectifier circuits.

9. The system of claim 1, wherein the at least one multi-phase generator is a twelve-phase generator, wherein the twelve-phase generator is coupled to each of the plurality of diode rectifier circuits, wherein each of the plurality of diode rectifier circuits are configured in series with respect to another diode rectifier circuit of the plurality of diode rectifier circuits.

10. The system of claim 1, wherein an input speed varies between 50% to 100% inclusive of a total speed of the at least one multi-phase generator.

11. A method comprising:
    generating an alternating current (AC) voltage output;
    converting, by a plurality of diode rectifier circuits, the generated AC voltage output to a direct current (DC) voltage output,
    configuring, by configuration circuitry coupled to the plurality of diode rectifier circuits, the diode rectifier circuits in one of a first, second, or third configuration, wherein:

(a) in the first configuration, each diode rectifier circuit in the plurality of diode rectifier circuits is electrically coupled in parallel to achieve a first selected DC voltage output,
(b) in the second configuration, at least one first diode rectifier circuit in the plurality of diode rectifier circuits is electrically coupled in series with respect to at least one second diode rectifier circuit in the plurality of diode rectifier circuits to form a first series circuit, and wherein the first series circuit is electrically coupled in parallel with a second series circuit to achieve a second selected DC voltage output, or
(c) in the third configuration, each diode rectifier circuit in the plurality of diode rectifier circuits is electrically coupled in series to achieve a third selected DC voltage output; and
providing the first, second, or third selected DC voltage output to one or more load devices,
wherein the configuration circuitry is configured to configure the plurality of diode rectifier circuits in the first, second, and third configurations, wherein the first selected DC voltage level is distinct from the second selected DC voltage level and the third selected DC voltage level.

12. The method of claim 11, wherein the configuration circuitry is configured to configure the plurality of diode rectifier circuits to a different configuration in response to a change in selected DC voltage level.

13. The method of claim 11, wherein generating an AC voltage output further comprises generating at least a 135 Vac line-to-neutral output.

14. The method of claim 11, wherein generating an AC voltage output further comprises generating a multi-phase AC voltage output via at least one multi-phase generator, wherein the at least one multi-phased generator comprises two or more sets of three phases.

15. The method of claim 14, further comprising operating the at least one multi-phase generator at a constant or variable input speed.

16. The method of claim 14, further comprising operating the at least one multi-phase generator at an input speed between 50% to 100% inclusive of a total input speed of the at least one multi-phased generator.

17. The method of claim 11, wherein converting the generated AC voltage output further comprises passively converting the generated AC voltage output using the plurality of diode rectifier circuits.

18. The method of claim 11, further comprising generating a DC voltage output at one of: 300 VDC, 600 VDC, 1,200 VDC and 2,400 VDC.

19. The method of claim 11, wherein converting the generated AC voltage output to a DC voltage output further comprises selecting a DC voltage based on the voltage, power, or current specifications of the one or more load devices.

20. The method of claim 11, wherein converting the generated AC voltage output by the plurality of diode rectifier circuits further comprises converting by at least four diode rectifier circuits.

* * * * *